(12) United States Patent
Balliet et al.

(10) Patent No.: US 6,838,199 B2
(45) Date of Patent: Jan. 4, 2005

(54) START UP SYSTEM AND METHOD FOR A FUEL CELL POWER PLANT USING A CATHODE ELECTRODE FUEL PURGE

(75) Inventors: Ryan J. Balliet, West Hartford, CT (US); Carl A. Reiser, Stonington, CT (US); Timothy W. Patterson, East Hartford, CT (US); Michael L. Perry, South Glastonbury, CT (US)

(73) Assignee: UTC Fuel Cells, LLC, South Windsor, CT (US)

( * ) Notice: Subject to any disclaimer, the term of this patent is extended or adjusted under 35 U.S.C. 154(b) by 195 days.

(21) Appl. No.: 10/329,874

(22) Filed: Dec. 26, 2002

(65) Prior Publication Data

US 2004/0126628 A1 Jul. 1, 2004

(51) Int. Cl.$^7$ .............................................. H01M 8/00
(52) U.S. Cl. .............................. 429/13; 429/17; 429/22
(58) Field of Search ............................ 429/13, 17, 22

(56) References Cited

U.S. PATENT DOCUMENTS

| | | |
|---|---|---|
| 6,024,848 A | 2/2000 | Dufner et al. |
| 6,432,566 B1 | 8/2002 | Condit et al. |
| 2002/0132146 A1 * | 9/2002 | Mund .......................... 429/13 |
| 2003/0134165 A1 * | 7/2003 | Reiser et al. .................. 429/13 |

* cited by examiner

*Primary Examiner*—Dah-Wei Yuan
(74) *Attorney, Agent, or Firm*—Malcolm J. Chisholm, Jr.

(57) ABSTRACT

The invention is a start up system and method for a fuel cell power plant (10) using a purging of the cathode flow field (38) with a hydrogen rich reducing fluid fuel to minimize corrosion of the cathode electrode (16). The method for starting up the shut down fuel cell power plant (10) includes the steps of: a. purging the cathode flow field (38) with the reducing fluid fuel; b. then, directing the reducing fluid fuel to flow through an anode flow field (28); c. next, terminating flow of the fuel through the cathode flow field (38) and directing an oxygen containing oxidant to flow through the cathode flow field (38); and, d. finally, connecting a primary load (70) to the fuel cell (12) so that electrical current flows from the fuel cell (12) to the primary load (70).

11 Claims, 1 Drawing Sheet

START UP SYSTEM AND METHOD FOR A FUEL CELL POWER PLANT USING A CATHODE ELECTRODE FUEL PURGE

TECHNICAL FIELD

The present invention relates to fuel cell power plants that are suited for usage in transportation vehicles, portable power plants, or as stationary power plants, and the invention especially relates to procedures for starting up a shut down fuel cell power plant.

BACKGROUND ART

Fuel cell power plants are well known and are commonly used to produce electrical energy from hydrogen containing reducing fluid and oxygen containing oxidant reactant streams to power electrical apparatus such as motors, and transportation vehicles, etc. In fuel cell power plants of the prior art, it has been discovered that, upon start up of fuel cells of the plant, corrosion takes place on electrodes, and especially on cathode electrodes. That corrosion leads to performance loss of the cathode electrodes and the plant.

In starting up known fuel cell power plants that contain air on both electrodes and that employ a proton exchange membrane "PEM" as an electrolyte disposed between a cathode and anode electrode, an oxygen containing oxidant is directed to flow through a cathode flow field that directs the oxidant to flow adjacent to the cathode electrode. At about the same time a hydrogen rich reducing fluid fuel stream is directed to flow through an anode flow field that directs the fuel to flow adjacent the anode electrode. As the fuel flows through the anode flow field, a fuel-air front is created moving along the anode electrode until the fuel forces all of the air out of the anode flow field. It has been observed that the electrode that is opposite the fuel-air front experiences substantial corrosion with each start up of the known fuel cell power plant. In particular, examination of used fuel cells that experienced only a few dozen start up and shut down cycles showed that 25% to 30% of a high surface area carbon that supported the cathode catalyst of the cathode electrode had been corroded away. An explanation of a mechanism that causes that corrosion and related performance decay has been offered in a U.S. Patent Application owned by the assignee of all rights in the present invention, which Application was published on Jun. 20, 2002 under number US-2002-0076582-A1.

It is known that purging the anode and cathode flow fields with inert gases immediately upon shut down of the fuel cell power plant passivates the anode and cathode electrodes to minimize such oxidative decay. However, use of inert purge gases gives rise to substantially increased complexity and cost of the fuel cell power plant that are undesirable especially in automotive applications where compactness and low cost are critical, and where the system must be shut down and started up frequently. Another solution to the problem of start up corrosion described in the aforesaid published Application proposes an extremely rapid purging of the anode flow field upon start up with the hydrogen rich reducing fluid fuel so that air is purged from the anode flow field in no more than one second, or as quickly as no more than 0.05 seconds. It is apparent that the mechanism leading to corrosion of the carbon supporting the electrode catalyst positioned to be opposite the flow field having the fuel-air front occurs extremely rapidly during fuel cell start up. While known attempts to solve this problem have limited electrode decay, it is still desirable to eliminate or further minimize electrode corrosion upon start up of a fuel cell power plant.

DISCLOSURE OF INVENTION

The invention is a start up system and method for a fuel cell power plant using a purging of the cathode flow field with a hydrogen rich reducing fluid fuel. The fuel cell power plant includes at least one fuel cell for generating electrical current from a hydrogen containing reducing fluid fuel and an oxygen containing oxidant, and a primary load that receives the electrical current through an external circuit secured between the primary load and the fuel cell, wherein the primary load is disconnected during shut down of the plant. The fuel cell includes an anode electrode and a cathode electrode on opposed sides of an electrolyte, an anode flow field adjacent the anode electrode for directing the reducing fluid fuel to flow adjacent to the anode electrode, and a cathode flow field adjacent the cathode electrode for directing the oxygen containing oxidant to flow adjacent the cathode electrode.

The method for starting up the shut down fuel cell power plant includes the steps of: a. purging the cathode flow field with the reducing fluid fuel by directing the reducing fluid fuel to flow through the cathode flow field; b. then, directing the reducing fluid fuel to flow through the anode flow field; c. next, terminating flow of the reducing fluid through the cathode flow field and directing the oxygen containing oxidant to flow through the cathode flow field; and, d. finally, connecting the primary load to the fuel cell so that the electrical current flows from the fuel cell to the primary load.

By purging the cathode flow field with fuel prior to admitting the fuel into the anode flow field, and then flowing the oxygen containing oxidant into the cathode flow field, the electrode that is opposite the fuel-air front is the anode electrode. Therefore, the anode electrode will preferentially corrode instead of the cathode electrode. Because of the known higher diffusivity, solubility and reactivity of hydrogen compared to oxygen, and because of a much higher concentration of hydrogen in the fuel compared to the oxygen concentration within an air oxidant, the effect of corrosion of the anode electrode does not significantly diminish mass transfer of the hydrogen on the anode electrode. Therefore, fuel cell performance does not decay as rapidly as it would if the same corrosion took place on the cathode electrode. In effect, by using the present cathode electrode fuel purge, the anode electrode is sacrificed in favor of enhanced performance of the cathode electrode.

In a preferred embodiment of the present invention, the anode electrode consists of a platinum, or platinum alloy, metal black catalyst, instead of a platinum catalyst supported on a carbon black. By using the cathode electrode fuel purge, corrosion of the cathode is eliminated or minimized, and oxidative corrosion of the anode electrode catalyst support does not take place because the anode electrode does not include any carbon.

In an additional preferred embodiment, an auxiliary load is applied to the fuel cell after the cathode flow field is purged with the hydrogen rich reducing fluid fuel. By applying the auxiliary load, oxygen within the anode flow field is consumed in an electrochemical reaction. Because oxygen is thereby consumed within the anode flow field, when the fuel is directed to flow through the anode flow field, there will be no safety concern. When the oxygen is consumed, the fuel is directed through the anode flow field, and then the auxiliary load is disconnected. Next, the oxidant is directed through the cathode flow field; and, then the primary load is connected to the fuel cell.

In a further preferred embodiment, the fuel cell power plant includes an anode recycle line secured between an anode exhaust line and inlet line for directing a portion of an anode exhaust stream exiting the anode flow field back into the anode flow field. A recycle blower is secured to the anode recycle line for blowing the portion of the anode exhaust stream within the anode recycle line back into the anode inlet line and anode flow field. While the auxiliary load is connected to the fuel cell, the recycle blower is operated to hasten consumption of oxygen within the anode flow field and the anode recycle line.

The system for starting up the fuel cell power plant using the cathode electrode fuel purge includes: a. an oxidant inlet valve secured to an oxidant inlet line in fluid communication between an oxidant source and the cathode flow field for selectively permitting and terminating passage of the oxygen containing oxidant through the oxidant inlet line into the cathode flow field; b. an anode flow field isolation valve secured to a reducing fluid inlet line in fluid communication between a reducing fluid fuel source and the anode flow field for selectively permitting and terminating passage of the reducing fluid fuel through the reducing fluid inlet line into the anode flow field; and, c. a cathode fuel purge valve secured in fluid communication between the reducing fluid fuel source and the cathode flow field. The cathode fuel purge valve is secured so that whenever the oxidant inlet valve and the anode flow field isolation valve are closed, the cathode fuel purge valve is open to permit passage of the reducing fluid fuel into the cathode flow field to purge the cathode flow field upon start up of the fuel cell power plant. Additionally, whenever the oxidant inlet valve and anode flow field isolation valve are open, the cathode fuel purge valve is closed to prevent flow of the reducing fluid fuel into the cathode flow field.

Accordingly, it is a general purpose of the present invention to provide a start up system and method for a fuel cell power plant using a cathode electrode fuel purge that overcomes deficiencies of the prior art.

It is a more specific purpose to provide a start up system and method for a fuel cell power plant using a cathode electrode fuel purge that minimizes corrosion of carbon support materials of a cathode electrode.

It is yet another purpose to provide a start up system and method for a fuel cell power plant using a cathode electrode fuel purge that minimizes corrosion of an anode electrode.

These and other purposes and advantages of the present start up system and method for a fuel cell power plant using a cathode electrode fuel purge will become more readily apparent when the following description is read in conjunction with the accompanying drawing.

DESCRIPTION OF THE PREFERRED EMBODIMENTS

Figure 1:
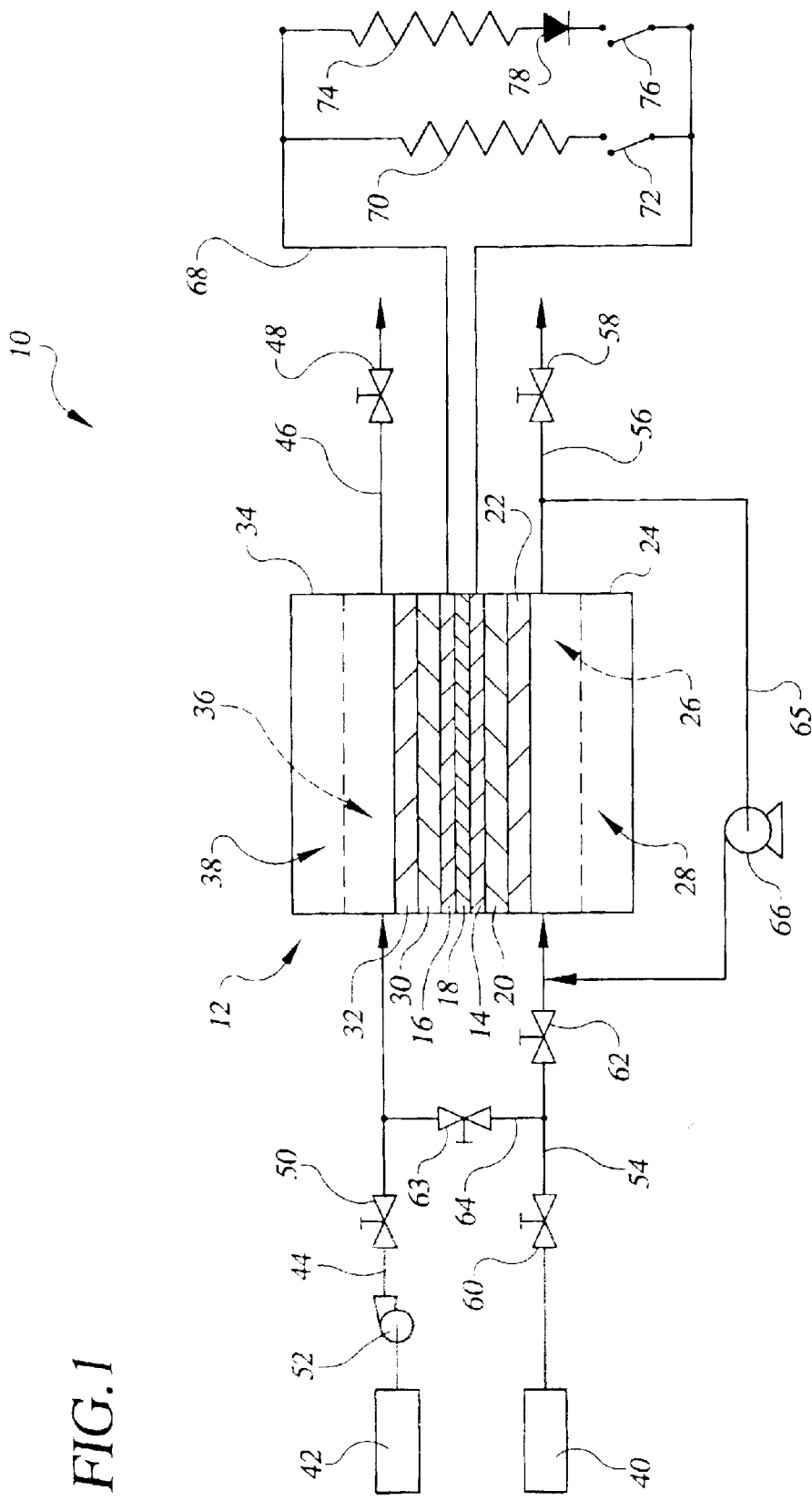
FIG. 1 is a schematic representation of a preferred embodiment of a start up system for a fuel cell power plant using a cathode electrode fuel purge constructed in accordance with the present invention.

Referring to the drawings in detail, a start up system for a fuel cell power plant using a cathode electrode fuel purge is shown in FIG. 1, and is generally designated by the reference numeral 10. The system includes a fuel cell 12 having an anode electrode 14, a cathode electrode 16, and an electrolyte 18 disposed between the anode and cathode electrodes 14, 16. The electrolyte 18 may be in the form of a proton exchange membrane (PEM) of the type described in U.S. Pat. No. 6,024,848, or the electrolyte may be held within a ceramic matrix, such as is typically found in acid aqueous electrolyte fuel cells, such as phosphoric acid electrolyte fuel cells, or may be used with alkaline, molten carbonate and solid oxide electrolyte fuel cells that are known in the art.

The anode electrode 14 may consist of a platinum catalyst supported on a known support material, such as carbon black, which is known in the art. Alternatively, a first alternative anode electrode 14 may be a platinum, or platinum alloy, metal black anode electrode. For convenience, the first alternative anode electrode 14 in the form of a "platinum, or platinum alloy, metal black anode electrode" will be collectively referred to hereinafter as a "platinum black anode electrode". As is known in the art, platinum supported on a carbon black became commonly used in fuel cells because the carbon black provided better utilization of the platinum at low platinum loadings than previous usage of platinum black alone as the electrode. However, for the present invention, the anode electrode 14 may be either a platinum catalyst supported on a carbon black, or a platinum black anode electrode. The platinum black anode electrode 14 may be applied in any manner known in the art, such as by vapor deposition, electrochemical deposition, or directly as a powder to the electrolyte 18 or to an adjacent anode diffusion layer 20.

The anode diffusion layer 20 may be secured to an anode substrate 22 that is in turn secured to an anode water transport or separator plate 24. The anode water transport plate 24 includes at least one fuel channel 26 for directing a hydrogen rich reducing fuel through the anode water transport plate 24, and the fuel channel 26 and plate 24 cooperate to define an anode flow field 28. The anode flow field 28 serves to direct the reducing fluid to pass adjacent to the anode electrode 14, as is known in the art, and shown for example in U.S. Pat. No. 6,432,566 that issued on Aug. 13, 2002, and is owned by the assignee of all rights in the present invention.

The cathode electrode 16 consists of any electrode known in the fuel cell art, such as a platinum catalyst secured to a carbon black support that is secured directly to the electrolyte 18, or to a cathode diffusion layer 30. The cathode diffusion layer 30 may be supported by a cathode substrate 32 that is in turn secured to a cathode water transport or separator plate 34. The cathode water transport plate 34 includes at least one oxidant channel 36 for directing an oxygen containing oxidant, such as air, through the cathode water transport plate 34, and the oxidant channel 36 and plate 34 cooperate to define a cathode flow field 38. The cathode flow field 38 serves to direct the oxidant to flow adjacent to the cathode electrode 16, as is known in the art.

It is to be understood that the scope of the present invention includes the aforesaid anode flow field 28 and a cathode flow field 38 that may consist of the described pores and channels 26, 36. The anode and cathode flow fields 28, 38 may also be formed by any known structure within the art, such as channels, passageways, cavities, etc., art that can serve to direct the reactant streams passing through the flow fields 28, 38 to pass adjacent to either the anode or cathode electrodes 14, 16. Although only a single cell 12 is shown, the invention also includes a plurality of adjacent cells (i.e. a "cell stack assembly") connected electrically in series, each having an anode or cathode water transport plate 24, 34 or a separator plate (not shown) separating the cathode flow field of one cell from an anode flow field of an adjacent cell, as is well known in the art.

The system 10 includes a hydrogen containing reducing fluid fuel source 40 and an oxidant source 42, such as air.

The fuel may be pure hydrogen or other hydrogen rich fuel, such as reformed natural gas or gasoline. An oxidant inlet line 44 carries air from the oxidant source 42 into the cathode flow field 38, and a cathode exhaust line 46 carries a cathode exhaust stream away from the cathode flow field 38, and out of the fuel cell 12 through a cathode exhaust vent valve 48. An oxidant inlet valve 50 is secured to the oxidant inlet line 44 for permitting and terminating flow of the oxygen containing oxidant or air through the cathode flow field 38. A blower 52 may be secured to the oxidant inlet line 44 to increase a pressure of the oxidant passing through the cathode flow field 38.

A reducing fluid inlet line 54 is secured in fluid communication between the fuel source 40 and the anode flow field 28, and an anode exhaust line 56 directs the reducing fluid fuel stream out of the anode flow field 28, and through an anode exhaust vent valve 58 out of the fuel cell 12. A reducing fluid inlet valve 60 is secured to the reducing fluid inlet line 54 for selectively permitting or terminating flow of the hydrogen containing reducing fluid fuel through the anode flow field 28. An anode flow field isolation valve 62 is also secured to the reducing fluid inlet line 54, as shown in FIG. 1, between the reducing fluid inlet valve 60 and the anode flow field 28.

A cathode fuel purge valve 63 is secured in fluid communication between the reducing fluid source 40 and the cathode flow field 38. As shown in FIG. 1, the cathode fuel purge valve 63 may be secured to a cathode fuel purge line 64 that is secured in fluid communication with the reducing fluid inlet line 54 between the reducing fluid inlet valve 60 and the anode flow field isolation valve 62. The cathode fuel purge line 64 is also secured to the oxidant inlet line 44 between the oxidant inlet valve 50 and the cathode flow field 38.

An anode recycle line 65 may be secured in fluid communication with the anode exhaust line 56 and the reducing fluid inlet line 54 between the anode isolation valve 62 and the anode flow field 28, so that the anode recycle line 65 may selectively direct a portion of the anode exhaust stream exiting the anode flow field 28 back into the anode flow field 28. The anode recycle line 65 includes an anode recycle pump or blower 66 for moving a portion of the anode exhaust stream within the anode exhaust line 56 through the anode recycle line 65 and back into the anode flow field 28.

The system for starting up a fuel cell power plant 10 also includes an external circuit 68 connecting the anode electrode 14 and cathode electrode 16. The external circuit 68 includes a primary load 70 connected to the external circuit 68 through a primary load switch 72 for receiving electrical current generated by the fuel cell 12. The external circuit 68 may also include an auxiliary resistive load 74 connected to the external circuit 68 through an auxiliary load switch 76. When the fuel cell 12 is shut down, the primary load switch 72 is open, and the auxiliary load switch 76 may be open or closed. During normal operation of the fuel cell 12, the primary load switch is closed (it is shown open in FIG. 1), and the auxiliary load switch 76 is open, so that the fuel cell 12 is providing electricity to the primary load 70, such as an electric motor, etc. A diode 78 may be placed in series with the auxiliary load 74, and the diode 78 may be constructed to permit current flow through the auxiliary load 78 only when the voltage is greater than about 0.2 volts per fuel cell 12.

Therefore, during normal operation of the fuel cell 12, an oxygen containing oxidant such as air from the oxidant source 42 is delivered into the cathode flow field 38 through the oxidant inlet line 44, and leaves the cathode flow field 38 through the cathode exhaust line 46. The hydrogen containing reducing fluid fuel from the fuel source 40 is delivered into the anode flow field 28 through the anode inlet line 54. A portion of the anode exhaust, containing depleted hydrogen fuel, leaves the anode flow field 28 through the anode exhaust line 56 and the anode exhaust vent valve 58, while the anode recycle line 65 and recycle blower 66 re-circulates the balance of the anode exhaust back through the anode flow field 28 in a manner well know in the prior art. Recycling a portion of the anode exhaust helps maintain a relatively uniform gas composition through the anode flow field 28, and also permits increased hydrogen utilization. As the hydrogen passes through the anode flow field, it electrochemically reacts on the catalyst of the anode electrode 14 in a well-known manner to produce protons (hydrogen ions) and electrons. The electrons flow from the anode electrode 14 to the cathode electrode 16 through the external circuit 68 to power the primary load 70, while the protons are transported through the electrolyte 18 to the cathode electrode 16.

The method for starting up the fuel cell power plant 10 that is shut down includes the following steps. First, the cathode flow field 38 is purged with the reducing fluid fuel by directing the fuel to flow through the cathode flow field 38. Then, the reducing fluid fuel is directed to flow through the anode flow field 28. Next, flow of the fuel through the cathode flow field 38 is terminated, and the oxygen containing oxidant is directed to flow through the cathode flow field 38, thereby permitting production of electrical current by the fuel cell 12. Finally, the primary load switch 72 is closed so that electrical current flows through the external circuit 68 to the primary load 70 to finish start up of the fuel cell 12.

An alternative method for starting the fuel cell 12 includes utilizing the auxiliary load 74. After the step of purging the cathode flow field 38 with fuel, the auxiliary load switch 76 is closed while the primary load switch 72 remains open. This allows the hydrogen at the cathode electrode 16 to be consumed and oxygen at the anode electrode 14 to be consumed in well-known electrochemical reactions. By consuming oxygen at the anode electrode 14, when the reducing fluid fuel is directed to flow through the anode flow field 28, no or less oxygen will be present within the anode flow field 28, thereby further lessening any safety concerns. Additionally, the anode recycle blower 66 may be operated during the alternative start up method to move any oxygen within the anode recycle line 65 through the anode flow field 28 to consume that oxygen. That would promote much more rapid consumption of oxygen within the anode recycle line 65, and anode flow field 28. Once oxygen within the anode flow field 28 is substantially consumed, the anode recycle blower 66 may be turned off. Then, reducing fluid fuel is directed to flow through the anode flow field 28. Next, the auxiliary load switch 76 is opened; and, the oxidant is directed to flow through the cathode flow field 38 to permit the fuel cell 12 to generate electrical current. Finally, the primary load switch 72 is closed to complete start up of the fuel cell 12. The step of utilizing the auxiliary load 70 to consume oxygen within the anode flow field 28 may be utilized even if no anode recycle line 65 or anode recycle blower 66 is present in the system 10.

The system for starting up a shut down fuel cell power plant 10 includes the cathode fuel purge valve 63 being secured so that whenever the oxidant inlet valve 50 and the anode flow field isolation valve 62 are closed prohibiting passage through the valves, the cathode fuel purge valve 63 is open to permit the reducing fluid fuel to flow into the cathode flow field 38 to thereby purge the cathode flow field 38 upon start up of the fuel cell 12. Additionally, the cathode fuel purge valve 63 is secured so that whenever the oxidant inlet valve 50 and the anode flow field isolation valve 62 are open permitting passage through the valves, the cathode fuel purge valve 63 is closed to prevent flow of the reducing fluid fuel into the cathode flow field 38. By characterizing the cathode fuel purge valve 63 as being "secured so that" it is either open or closed depending upon the oxidant inlet valve 50 and anode flow field isolation valve 62 being open or closed, it is meant that the cathode fuel purge valve 63 may be controlled to be open or closed in response to the positions of the oxidant inlet valve 50 and anode flow field isolation valve 62 by any controller means known in the art for opening and closing valves. Such controller means may include mechanical controls, manual controls, solenoid actuated switches opening a valve in response to a sensed signal or sensed status of other valves, etc.

By purging the cathode flow field 38 with fuel prior to admitting the fuel into the anode flow field 28, and then flowing the oxidant into the cathode flow field 38 after the anode flow field 28 has been purged with fuel, the electrode that is opposite a fuel-air front upon start up is the anode electrode 14. Therefore, the anode electrode 14 will preferentially corrode instead of the cathode electrode 16. Because of the known higher diffusivity, solubility and reactivity of hydrogen compared to oxygen, and because of a much higher concentration of hydrogen in the fuel compared to the oxygen concentration within an air oxidant, the effect of corrosion of the anode electrode 14 does not significantly diminish mass transfer of the hydrogen on the anode electrode 14. Therefore, fuel cell performance does not decay as rapidly as it would if the same corrosion took place on the cathode electrode 16. In effect, by using the present cathode electrode 16 fuel purge, the anode electrode 14 is sacrificed in favor of enhanced performance of the cathode electrode 16. However, if the anode electrode 16 consists of a platinum black catalyst, and not a platinum catalyst on a carbon black support, the anode electrode 16 will sustain virtually no corrosion upon start up. Additionally, by use of the cathode electrode 16 fuel purge with a platinum black anode electrode 14 along with use of the auxiliary load 74 and anode recycle line 65 and anode recycle blower 66 to rapidly consume oxygen at the anode electrode 14, the present invention minimizes any corrosion of the cathode electrode 16 during start up of the fuel cell 12.

While the present invention has been disclosed with respect to the described and illustrated embodiments, it is to be understood that the invention is not to be limited to those embodiments. Accordingly, reference should be made primarily to the following claims rather than the foregoing description to determine the scope of the invention.

What is claimed is:

1. A method for starting up a fuel cell power plant (10) that is shut down, the shut down fuel cell power plant (10) including at least one fuel cell (12) for generating electrical current from a hydrogen containing reducing fluid fuel and an oxygen containing oxidant and a primary load (70) that receives the electrical current through an external circuit (68) secured between the primary load (70) and the fuel cell (12), the fuel cell including an anode electrode (14) and a cathode electrode (16) on opposed sides of an electrolyte (18), an anode flow field (28) adjacent the anode electrode (14) for directing the reducing fluid fuel to flow adjacent to the anode electrode (14), and a cathode flow field (38) adjacent the cathode electrode (16) for directing the oxygen containing oxidant to flow adjacent the cathode electrode (16), the method for starting up the shut down fuel cell power plant (10) comprising the steps of:

a. purging the cathode flow field (38) with the reducing fluid fuel by directing the reducing fluid fuel to flow through the cathode flow field (38);

b. then, directing the reducing fluid fuel to flow through the anode flow field (28);

c. then, terminating flow of the reducing fluid through the cathode flow (38) field and directing the oxygen containing oxidant to flow through the cathode flow field (38); and, d. connecting the primary load (70) to the fuel cell (12) so that the electrical current flows from the fuel cell (12) to the primary load (70).

2. The method for starting up a shut down fuel cell power plant (10) of claim 1, comprising the further step of securing a platinum black anode electrode (14) between the electrolyte (18) and the anode flow field (28).

3. The method for starting up a shut down fuel cell power plant (10) of claim 1, comprising the further step of, after the step of purging the cathode flow field (38) with the reducing fluid fuel and before the step of directing the reducing fluid fuel to flow through the anode flow field (28), connecting an auxiliary load (74) to the fuel cell (12) to consume oxygen within the anode flow field (28), and then whenever the oxygen within the anode flow field (28) is substantially consumed directing the reducing fluid fuel to flow through the anode flow field (28), then disconnecting the auxiliary load (74), and then connecting the primary load (70) to the fuel cell (12).

4. The method for starting up a shut down fuel cell power plant (10) of claim 1, comprising the further step of, after the step of purging the cathode flow field (38) with the reducing fluid fuel and before the step of directing the reducing fluid fuel to flow through the anode flow field (28), connecting an auxiliary load (74) in series with a diode (78) to the fuel cell (12) to consume oxygen within the anode flow field (28), the diode (78) permitting electrical current flow through the auxiliary load (74) when electrical current of the at least one fuel cell (12) is greater than 0.2 volts, and then whenever the oxygen within the anode flow field (28) is substantially consumed directing the reducing fluid fuel to flow through the anode flow field (28), then disconnecting the auxiliary load (74), and then connecting the primary load (70) to the fuel cell (12).

5. The method for starting up a shut down fuel cell power plant (10) of claim 3, comprising the further step of securing an anode recycle line (65) between an anode exhaust line (56) and a reducing fluid inlet line (54) of the fuel cell (12) for recycling a portion of an anode exhaust stream leaving the anode flow field (28) back into the anode flow field 28, securing a recycle blower (66) to the anode recycle line (65) for blowing the portion of the anode exhaust within the anode recycle line (65) back into the anode flow field (28), and operating the recycle blower (66) whenever the auxiliary load (74) is connected to the fuel cell (12).

6. A system for starting up a fuel cell power plant (10), the system comprising:

a. at least one fuel cell (12) for generating electrical current from a hydrogen containing reducing fluid fuel and an oxygen containing oxidant, the fuel cell (12) including an anode electrode (14) and a cathode electrode (16) on opposed sides of an electrolyte (18), an anode flow field (28) adjacent the anode electrode (14) for directing the reducing fluid fuel to flow adjacent to the anode electrode (14), and a cathode flow field (38) adjacent the cathode electrode (16) for directing the oxygen containing oxidant to flow adjacent the cathode electrode (16);

b. an oxidant inlet valve (50) secured to an oxidant inlet line (44) in fluid communication between an oxygen containing oxidant source (42) and the cathode flow field (38) for selectively permitting and terminating passage of the oxidant through the cathode inlet line (44) into the cathode flow field (38);

c. an anode flow field isolation valve (62) secured to a reducing fluid inlet line (54) in fluid communication between a reducing fluid fuel source (40) and the anode flow field (28) for selectively permitting and terminating passage of the reducing fluid fuel through the reducing fluid inlet line (54) into the anode flow field (28);

d. a cathode fuel purge valve (63) secured in fluid communication between the reducing fluid fuel source (40) and the cathode flow field (28), the cathode fuel purge valve (63) being secured so that whenever the oxidant inlet valve (50) and the anode flow field isolation valve (62) are closed, the cathode fuel purge valve (63) is open to permit passage of the reducing fluid fuel into the cathode flow field (38) to purge the cathode flow field (38) upon start up of the fuel cell power plant (10), and whenever the oxidant inlet valve (50) and anode flow field isolation (62) valve are open, the cathode fuel purge valve (63) is closed to prevent flow of the reducing fluid fuel into the cathode flow field (28).

7. The system for starting up a fuel cell power plant (10) of claim 6, further comprising:

a. a reducing fluid inlet valve (60) secured to the reducing fluid inlet line (54) between the anode isolation valve (62) and the reducing fluid fuel source (40) for selectively permitting and terminating passage of the reducing fluid fuel through the reducing fluid inlet line (54); and, b. wherein the cathode fuel purge valve (63) is secured in fluid communication with the reducing fluid inlet line (44) between the reducing fluid inlet valve (60) and the anode flow field isolation valve (62) and secured to the oxidant inlet line (44) between the oxidant inlet valve (50) and the cathode flow field (38), and the cathode fuel purge valve (63) is secured so that whenever the oxidant inlet valve (50) and the anode flow field isolation valve (62) are closed and the reducing fluid inlet valve (60) is open, the cathode fuel purge valve (63) is open to permit passage of the reducing fluid fuel from the reducing fluid inlet line (54) into the cathode flow field (28) to purge the cathode flow field (28) upon start up of the fuel cell power plant (12), and whenever the oxidant inlet valve (50), anode flow field isolation valve (62), and reducing fluid inlet valve (60) are open, the cathode fuel purge valve (63) is closed to prevent flow of the reducing fluid fuel into the cathode flow field (38).

8. The system for starting up a fuel cell power plant (10) of claim 6, wherein the anode electrode (14) comprises a platinum black anode electrode (14).

9. The system for starting up a fuel cell power plant (10) of claim 6, further comprising a primary load (70) secured in electrical communication with the fuel cell (12) so that the primary load (70) does not receive electrical current from the fuel cell (12) when the fuel cell is shut down, and an auxiliary load (74) secured in electrical communication with the fuel cell (12) so that whenever the cathode fuel purge valve (63) is open to permit the reducing fluid fuel into the cathode flow field (38), the auxiliary load (74) receives electrical current generated by the fuel cell (12) to consume oxygen within the anode flow field (28).

10. The system for starting up a fuel cell power plant (10) of claim 6, further comprising a primary load (70) secured in electrical communication with the fuel cell (12) so that the primary load (70) does not receive electrical current from the fuel cell (12) when the fuel cell is shut down, and an auxiliary load (74) secured in electrical communication with the fuel cell (12) and secured in series with a diode (78) to consume oxygen within the anode flow field (28), the diode (78) permitting electrical current flow through the auxiliary load (74) when voltage of the at least one fuel cell (12) is greater than 0.2 volts, so that whenever the cathode fuel purge valve (63) is open to permit the reducing fluid fuel into the cathode flow field (38), the auxiliary load (74) receives electrical current when voltage generated by the fuel cell (12) is greater than 0.2 volts to consume oxygen within the anode flow field (28).

11. The system for starting up a fuel cell power plant (10) of claim 9, further comprising an anode recycle line (65) secured between an anode exhaust line (56) and the reducing fluid inlet line (54) of the fuel cell (12) for recycling a portion of an anode exhaust stream leaving the anode flow field (28) back into the anode flow field (28), and a recycle blower (66) secured to the anode recycle line (65) for blowing the portion of the anode exhaust stream within the anode recycle line (65) back into the anode flow field (28), the anode recycle blower (66) being secured so that the anode recycle blower (66) is operating whenever the auxiliary load (74) receives electrical current from the fuel cell (12).

* * * * *